(12) United States Patent
Sugino et al.

(10) Patent No.: US 7,843,433 B2
(45) Date of Patent: Nov. 30, 2010

(54) CORDLESS POINTING DEVICE AND INFORMATION TERMINAL DEVICE

(75) Inventors: Heiichi Sugino, Shinagawa (JP); Fujio Seki, Shinagawa (JP); Takeshi Kasai, Shinagawa (JP)

(73) Assignee: Fujitsu Component Limited, Tokyo (JP)

(*) Notice: Subject to any disclaimer, the term of this patent is extended or adjusted under 35 U.S.C. 154(b) by 773 days.

(21) Appl. No.: 11/108,687

(22) Filed: Apr. 19, 2005

(65) Prior Publication Data

US 2005/0231470 A1    Oct. 20, 2005

(30) Foreign Application Priority Data

Apr. 20, 2004   (JP)   ............... 2004-124693

(51) Int. Cl.
  *G06F 3/033*   (2006.01)
  *G09G 5/08*   (2006.01)
(52) U.S. Cl. ...................... 345/166; 345/168
(58) Field of Classification Search ........... 345/165, 345/166, 168, 163, 156, 157
  See application file for complete search history.

(56) References Cited

U.S. PATENT DOCUMENTS

| | | | | |
|---|---|---|---|---|
| 5,413,294 A | * | 5/1995 | Greenquist | ............... 248/127 |
| 5,708,458 A | * | 1/1998 | Vrbanac | ............... 345/156 |
| 5,999,166 A | * | 12/1999 | Rangan | ............... 345/157 |
| 6,552,713 B1 | * | 4/2003 | Van Brocklin et al. | ...... 345/157 |
| 6,677,929 B2 | * | 1/2004 | Gordon et al. | ............... 345/156 |
| 2002/0052209 A1 | * | 5/2002 | Frohlund | ............... 455/456 |
| 2002/0130835 A1 | * | 9/2002 | Brosnan | ............... 345/156 |
| 2002/0155857 A1 | * | 10/2002 | Nishimoto | ............... 455/550 |
| 2004/0075640 A1 | * | 4/2004 | Liao | ............... 345/156 |

FOREIGN PATENT DOCUMENTS

| | | |
|---|---|---|
| JP | 5-8635 | 2/1993 |
| JP | 7-6818 | 1/1995 |
| JP | 08-179877 | 7/1996 |
| JP | 2002-318661 | 10/2002 |
| JP | 2002-351574 | 12/2002 |

OTHER PUBLICATIONS

Japanese Office Action dated Apr. 21, 2009 for corresponding Japanese Patent Application No. 2004-124693.
Japanese Office Action issued Jul. 27, 2010 in the corresponding Japanese Patent Application No. 2004-124693.

* cited by examiner

*Primary Examiner*—Stephen G Sherman
(74) *Attorney, Agent, or Firm*—Staas & Halsey LLP (57) ABSTRACT

A cordless pointing device used for moving a pointer displayed on a display screen and selecting information displayed on the display screen. The cordless pointing device includes an operation device having an optical reflection surface, a light emitting and receiving unit, which is a separate unit from the operation device, and emits a light to the optical reflection surface of the operation device and receives the light reflected on the optical reflection surface of the operation device, a switch for generating an instruction on information pointed by the pointer, and a control unit that moves the pointer according to a movement of the operation device detected by the light emitting and receiving unit when the light is received and detects the instruction given by the switch.

3 Claims, 9 Drawing Sheets

CORDLESS POINTING DEVICE AND INFORMATION TERMINAL DEVICE

BACKGROUND OF THE INVENTION

1. Field of the Invention

This invention generally relates to cordless pointing devices, and more particularly, to a cordless pointing device having a very thin-shaped operation unit to be operated by a user.

2. Description of the Related Art

In recent years, a pointing device has been used as an input device installed in an information device such as a personal computer. The pointing device is used for moving a pointer shown on the display screen so as to select information and give an instruction to the computer. There are various types of pointing devices such as track pad, track ball, and mouse.

Japanese Patent Application Publication No. 2002-318661 (hereinafter referred to as Document 1) discloses one of the aforementioned pointing devices. Document 1 describes a pointing device having an information display unit, a sensor, and a control unit. The information display unit displays information and the pointer for selecting the information. The sensor senses an optical image of a finger and detects a movement of the finger. The control unit moves the pointer based on the movement of the finger detected by the sensor. According to the pointing device disclosed in Document 1, the necessary information can be selected by moving the pointer displayed on the information display unit with only one finger.

Among the above-mentioned various types of the pointing devices, the track pad or the track ball can be incorporated into, for example, a keyboard, and does not take up much space even after the installation of the pointing device. However, a problem arises in user-friendliness, for example, the operator is required for getting used to the pointing device.

The pointing device described in Document 1 has an excellent user-friendliness when manipulating the pointer with one hand and holding a mobile terminal such as a mobile telephone in the other hand. In addition, the pointing device described in Document 1 does not take up much space even after the installation of the pointing device. However, when manipulating the pointer displayed on the display screen of a notebook PC, for example, there arises the same problem as the above-mentioned track pad or track ball in that the operator is required for getting used to the pointing device and the operation of the pointing device is not user-friendly. Moreover, the pointing device described in Document 1 reads optical images of a fingertip and then moves the pointer. It is to be noted that the fingertip cannot be focused on depending on the user's operation. If so, the optical image cannot be acquired completely.

Figure 1:
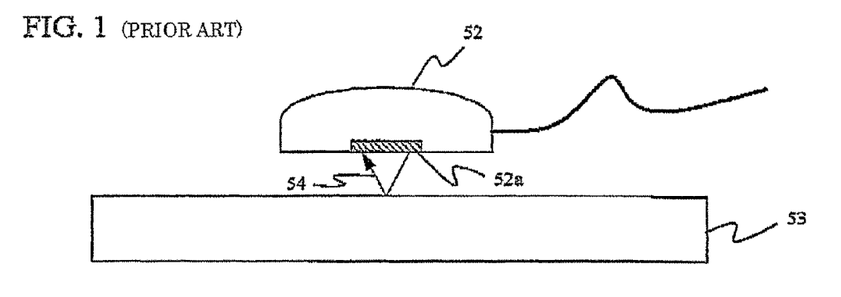
FIG. 1 shows a conventional optical mouse.

In contrast, a mouse is user-friendly and easy to use. Therefore, the mouse is employed in various information terminal devices represented by the personal computer. In these years, a light-emitting device and a light-receiving device are installed onto a main body of the mouse, which is known as an optical mouse, the pointer can be moved according to a moving direction of the mouse. Referring to FIG. 1, an optical mouse 52 includes an optical sensor 52*a* having the light-emitting device and the light-receiving device. The mouse 52 is manipulated on a desk 53 or the like. The optical sensor 52*a* receives a reflected light as shown by an arrow 54, senses a movement of the mouse 52, and reflects the movement in the pointer. Additionally, a wireless mouse has come into the market, and operability has been improved more than before. The wireless mouse is not connected with a code to the information terminal device such as a personal computer.

Figure 2:
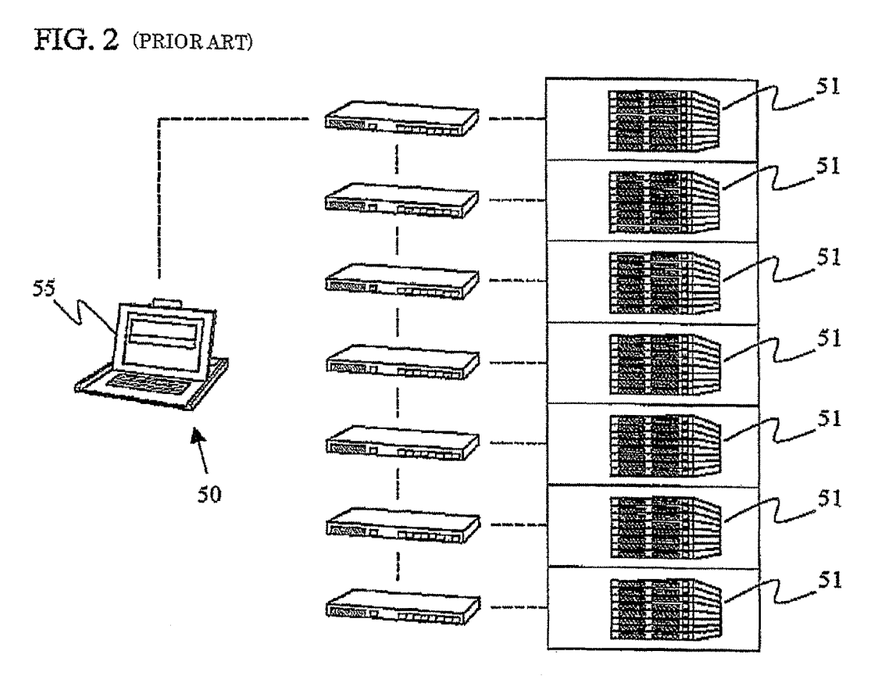
FIG. 2 schematically illustrates a connection state of a console drawer.
Figure 3:
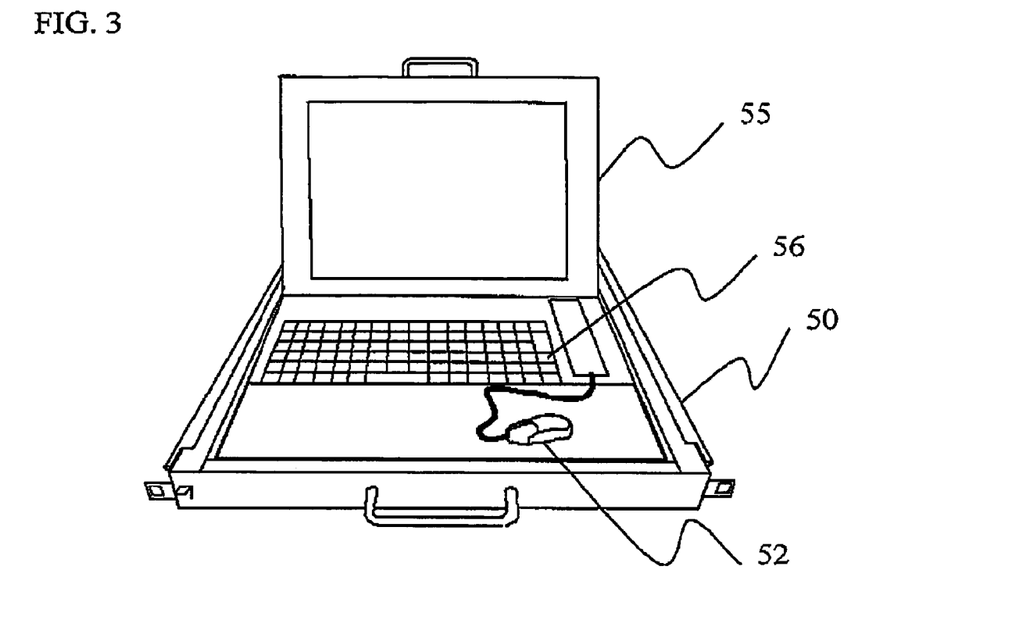
FIG. 3 is a perspective view of the console drawer into which a conventional mouse is incorporated.
Figure 4:
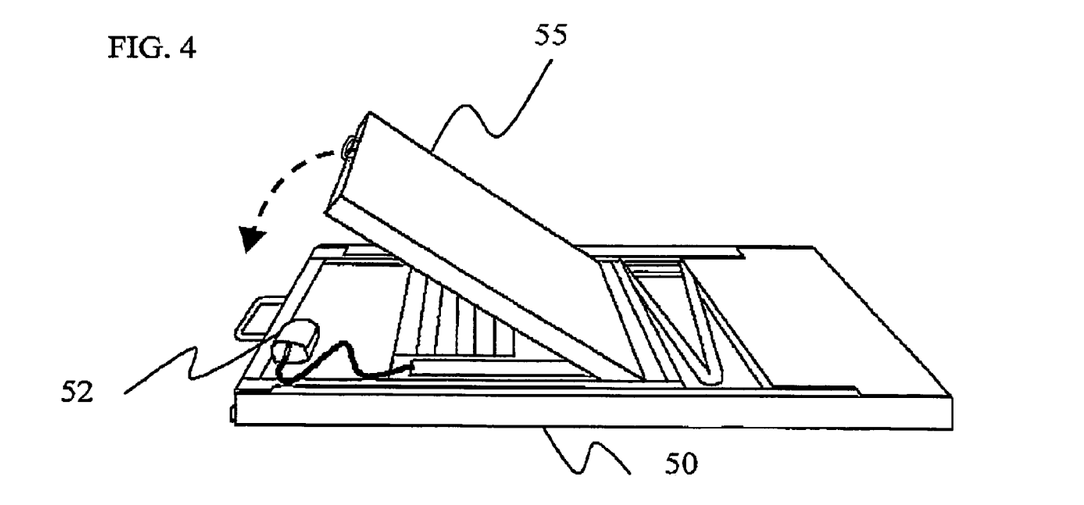
FIG. 4 illustrates how the mouse gets into contact with a display screen in the console drawer having a conventional mouse incorporated thereinto.

A console drawer is one of the information terminal devices. Referring to FIG. 2, a console drawer 50 includes a display screen 55 that can be opened and closed like a notebook PC. The console drawer 50 can be mounted on a rack 51 having multiple drawers like a chest of drawers. The console drawer 50 includes a keyboard 56 and a mouse 52. The operator manipulates the mouse 52 on a space in the vicinity of the keyboard 56. Here, the display screen 55 that can be opened and closed employs a liquid crystal display, in many cases. However, referring to FIG. 4, it the mouse 52 is placed in the vicinity of the keyboard 56 and the display screen 55 is mistakenly closed, the mouse 52 might damage the liquid crystal display of the display 55. Furthermore, the mouse 52 needs a certain space and height. In particular, the wireless mouse device includes a power supply such as a battery in the main body of the mouse, and thus there is a limitation of reducing the thickness of the mouse.

SUMMARY OF THE INVENTION

It is a general object of the present invention to provide a cordless pointing device of a thin-shaped operation unit having excellent operability and user-friendliness as compared to the conventional mouse.

According to one aspect of the present invention, preferably, there is provided a cordless pointing device used for moving a pointer displayed on a display screen and selecting information displayed on the display screen, the cordless pointing device includes an operation device having an optical reflection surface, a light emitting and receiving unit, which is a separate unit from the operation device, and emits a light to the optical reflection surface of the operation device and receives the light reflected on the optical reflection surface of the operation device, a switch for generating an instruction on information pointed by the pointer, and a control unit that moves the pointer according to a movement of the operation device detected by the light emitting and receiving unit when the light is received and detects the instruction given by the switch.

According to another aspect of the present invention, preferably, there is provided a keyboard including the above-mentioned cordless pointing device used for moving a pointer displayed on a display screen and selecting information displayed on the display screen.

According to another aspect of the present invention, preferably, there is provided an information terminal device includes an information input unit having the above-mentioned keyboard incorporated therein, and a display screen that can be opened and closed overlapping the information input unit, and the keyboard includes the above-mentioned cordless pointing device used for moving a pointer displayed on a display screen and selecting information displayed on the display screen.

According to another aspect of the present invention, preferably, there is provided an operation device including a reflection surface, and a portion operated by an operator's finger, a light being reflected on the reflection surface, the operation device being operated on a light emitting and receiving unit for emitting a light and receiving the light reflected by the reflection surface.

According to another aspect of the present invention, preferably, there is provided a mouse pad including a light emitter for emitting a light when a current is applied thereto, a light receiver for receiving a reflected light of a light emitted by the light emitter, and a moving direction detection unit detecting a relative moving direction of the reflected light received by the light receiver.

The mouse pad of the present invention emits and reflects a light, and thereby the thickness of the mouse can be reduced.

BRIEF DESCRIPTION OF THE DRAWINGS

Preferred embodiments of the present invention will be described in detail with reference to the following drawings, wherein.

DESCRIPTION OF THE PREFERRED EMBODIMENTS

A description will now be given, with reference to the accompanying drawings, of embodiments of the present invention.

A description will be given of a first embodiment of the present invention, with reference to drawings.

First Embodiment

A pointing device 3 includes a mouse 1 and a mouse pad 2 in accordance with the first embodiment of the present invention. The pointing device 3 is incorporated into a console drawer 4 shown in FIG. 9. The mouse 1 corresponds to an operation device, and the mouse pad 2 corresponds to a light emitting and receiving unit.

Figure 5:
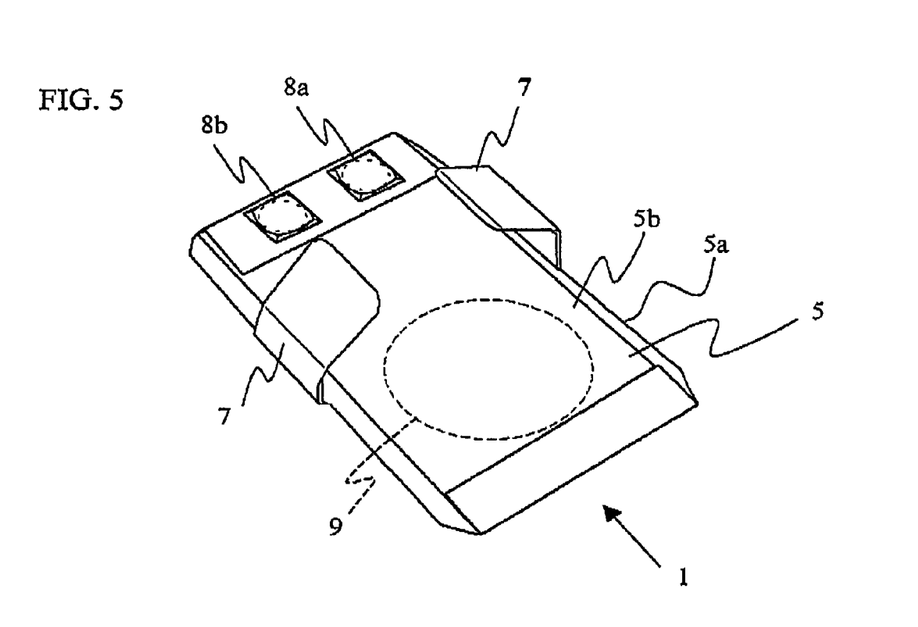
FIG. 5 is a perspective view of a mouse in accordance with a first embodiment of the present invention.
Figure 6:
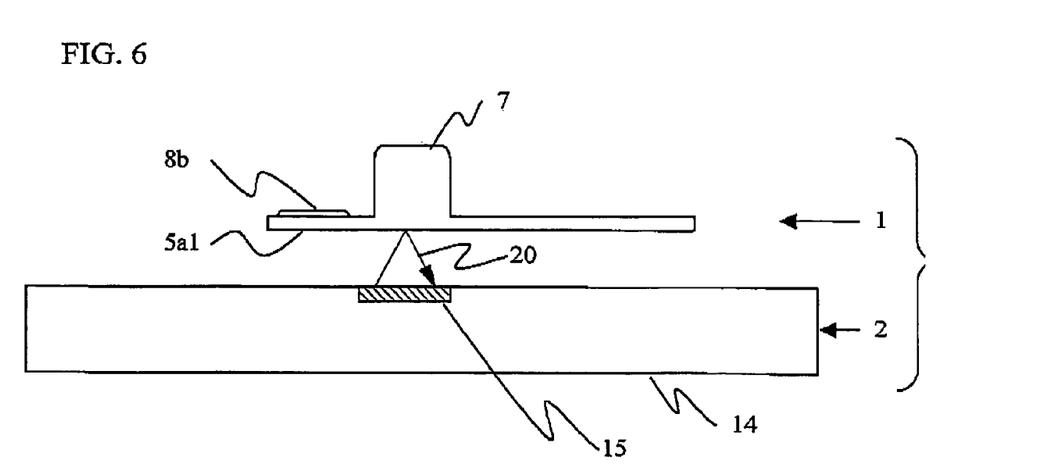
FIG. 6 illustrates how the mouse reflects a light emitted from a light-emitting device of the mouse pad in accordance with the first embodiment of the present invention.

First, a description will be given of the mouse 1. FIG. 5 is a perspective view of the mouse 1. The mouse 1 includes a plate 5. The plate 5 has a double-layered structure into which a first plate 5a and a second plate 5b are laminated. The plate 5 includes a holder 7 so that the user may latch the holder 7 to a fingertip 6 thereof. The holder 7 is made of a material that can be loosened. For example, the material gets dented if it is pushed down from the top. A rubber band may be used instead of the holder 7. FIG. 6 shows how a light-emitting device included in the mouse pad 2 reflects the lights. The mouse pad 2 will be described later in detail. A bottom face of the plate 5, that is, the bottom face of the first plate 5a has a plane optical reflection surface 5a1 for reflecting the light.

In addition, a right button 8a and a left button 8b are arranged in a region close to one end of the surface of the second plate 8b. The right button 8a and the left button 8b respectively have shapes of square column. Disc springs, which are not shown, are respectively provided for the right button 8a and the left button 8b, and are arranged between the first plate 5a and the second plate 5b so that the fingertip 6 can easily sense feelings of pushdown of the right button 8a and the left button 8b.

Figure 7:
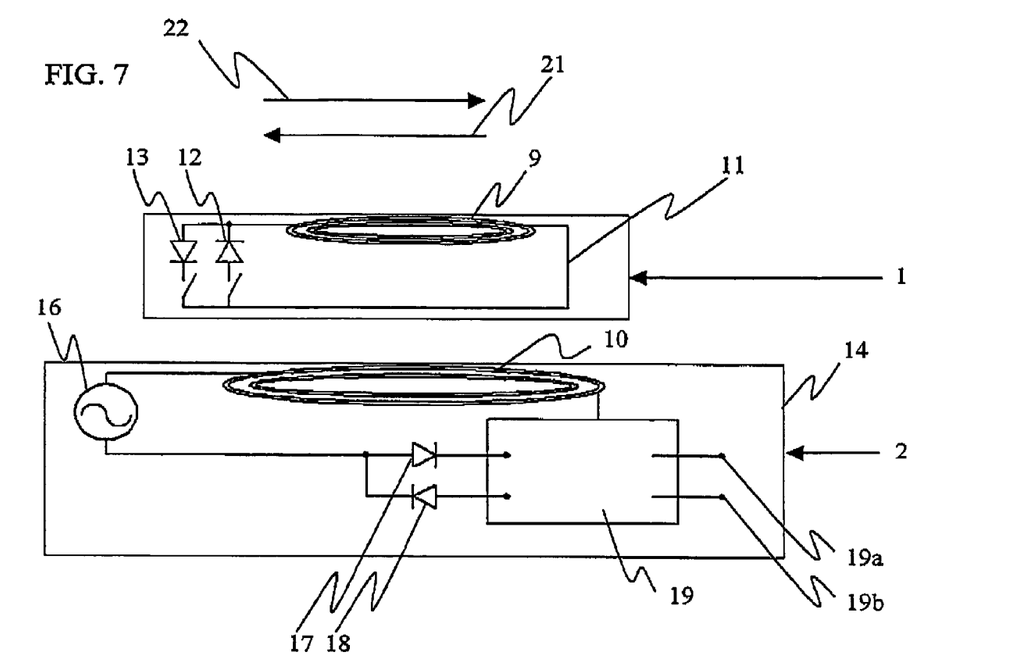
FIG. 7 is a circuit diagram of a pointing device in accordance with the first embodiment of the present invention.

Further, a mouse side coil 9 is printed on the first plate 5a of the mouse 1. The mouse side coil 9 generates an induced electromotive force due to the electromagnetic induction when a current passes a mouse pad side coil 10, which will be described later in detail. FIG. 7 schematically illustrates the mouse side coil 9 of the mouse 1 and the mouse pad side coil 10 of the mouse pad 2. The mouse side coil 9 is a part of a closed loop 11, which is formed by pressing down the right button 8a or the left button 8b. The closed loop 11 includes a first diode 12 and a second diode 13 so that current directions are different when the right button 8a is pushed down and the left button 8b is pushed down. An operation unit includes the mouse side coil 9, the closed loop 11, and the diodes 12 and 13. The mouse side coil 9 corresponds to on a first coil. A switch corresponds to the right button 8a or the left button 8b. The mouse 1 is thus configured.

Next, a description will be given of the mouse pad 2. The mouse pad 2 includes an optical sensor 15 in a plastic case 14. The optical sensor 15 is composed of a light emitter and a light receiver. The light emitter of the optical sensor is installed so that the emitted light may not shoot the user. The user's eyes are thus protected. The light emitter is configured to darken the light if the movement has not been sensed for a certain period of time. The mouse 1 reflects the light emitted from the optical sensor 15 as shown by an arrow 20 in FIG. 6. The light receiver senses the reflected light and sends the result to a control unit 19, which will be described later. Then, the optical sensor 15 detects the direction in which the mouse 1 moves.

The mouse pad 2 includes the mouse pad side coil 10, which is connected to an AC power supply 16, as shown in FIG. 7. The mouse pad side coil 10 is connected to the control unit 19 through diodes 17 and 18. The control unit 19 detects the movement of the mouse 1 and that the right button 8a or the left button 8b has been pushed down, and reflects the detection in the movement of the pointer displayed on the display screen. The control unit 19 corresponds to a moving direction detection unit that detects a relative moving direction of the reflected light received by the light receiver. The mouse pad side coil 10 corresponds to an on-off state detection unit. The mouse pad side coil 10 corresponds to a second coil. For simplification, the plastic case 14 includes only the optical sensor 15 and other elements are omitted in FIG. 6. The optical sensor 15 in the plastic case 14 is omitted in FIG. 7. The mouse pad 2 is thus configured.

Here, a description will be given of the detection of the mouse 1 and pushdown states of the right button 8a and the left button 8b. First, the right button 8a is pushed down, and the closed loop 11 is formed including the mouse side coil 9. The current flows through the mouse pad side coil 10 from the AC power supply 16, generates a magnetic field, and the current passes in the direction of an arrow 21 due to the induced electromotive force. Then, the current passes through the mouse side coil 9 in the direction of the arrow 21, another magnetic field, different from the above-mentioned one, is generated. This magnetic field changes the current flowing through the mouse pad side coil 10. The control unit 19 detects the change of the current, and determines that the right button 8a has been pushed. Then, the control unit 19 outputs an output signal to at-right button output 19a. On the other hand, the left button 8b is pushed down, and the closed loop 11 is formed including the mouse side coil 9. The current flows through the mouse pad side coil 10 from the AC power supply 16, generates a magnetic field, and the current passes in the direction of an arrow 22 due to the induced electromotive force. The current flowing in the direction of the arrow 22 passes through the mouse side coil 9, another magnetic field, different from the above-mentioned one, is generated. This magnetic field changes the current flowing through the mouse pad side coil 10. The control unit 19 detects the change of the current, and determines that the left button 8b has been pushed. Then, the control unit 19 outputs the output signal to a left button output 19b. Here, the current flows through the closed loop 11 in the direction of the arrow 21, when the right button 8a is pushed down. The current flows through the closed loop 11 in the direction of the arrow 22, in the case where the left button 8b is pushed down. Therefore, the changes in the currents flowing through the mouse pad side coil 10 are different. Judging from the difference in the changes, it is possible to determine where the right button 8a or the left button 8b has been pushed down. A magnetic field change detection unit is composed of the mouse pad side coil 10 and the control unit 19.

Figure 8:
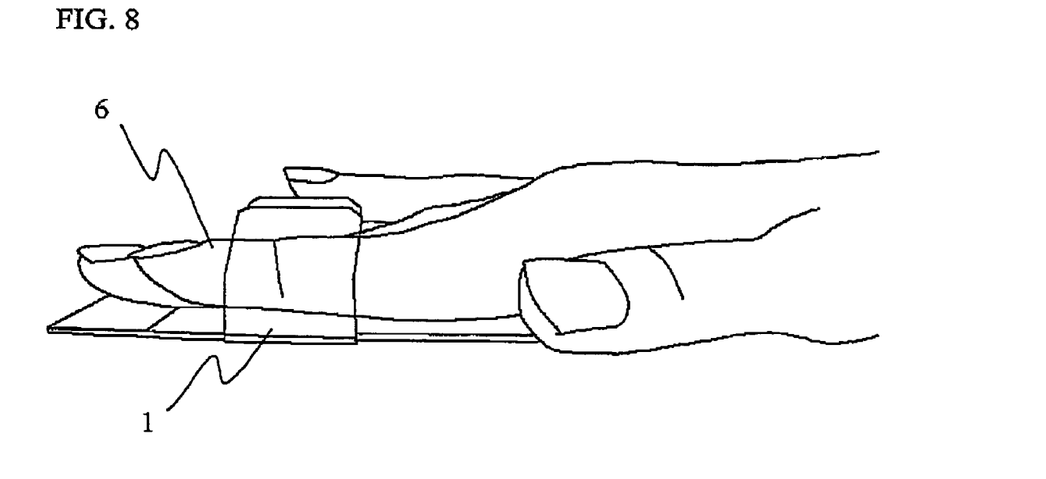
FIG. 8 illustrates how the mouse is used in accordance with the first embodiment of the present invention.

Referring to FIG. 8, when the pointing device 3 is used as described above, the fingertip 6 is latched to the holder 7 of the mouse 1. How to operate is same as the conventional mouse, and the mouse 1 is manipulated on the mouse pad 2.

Figure 9:
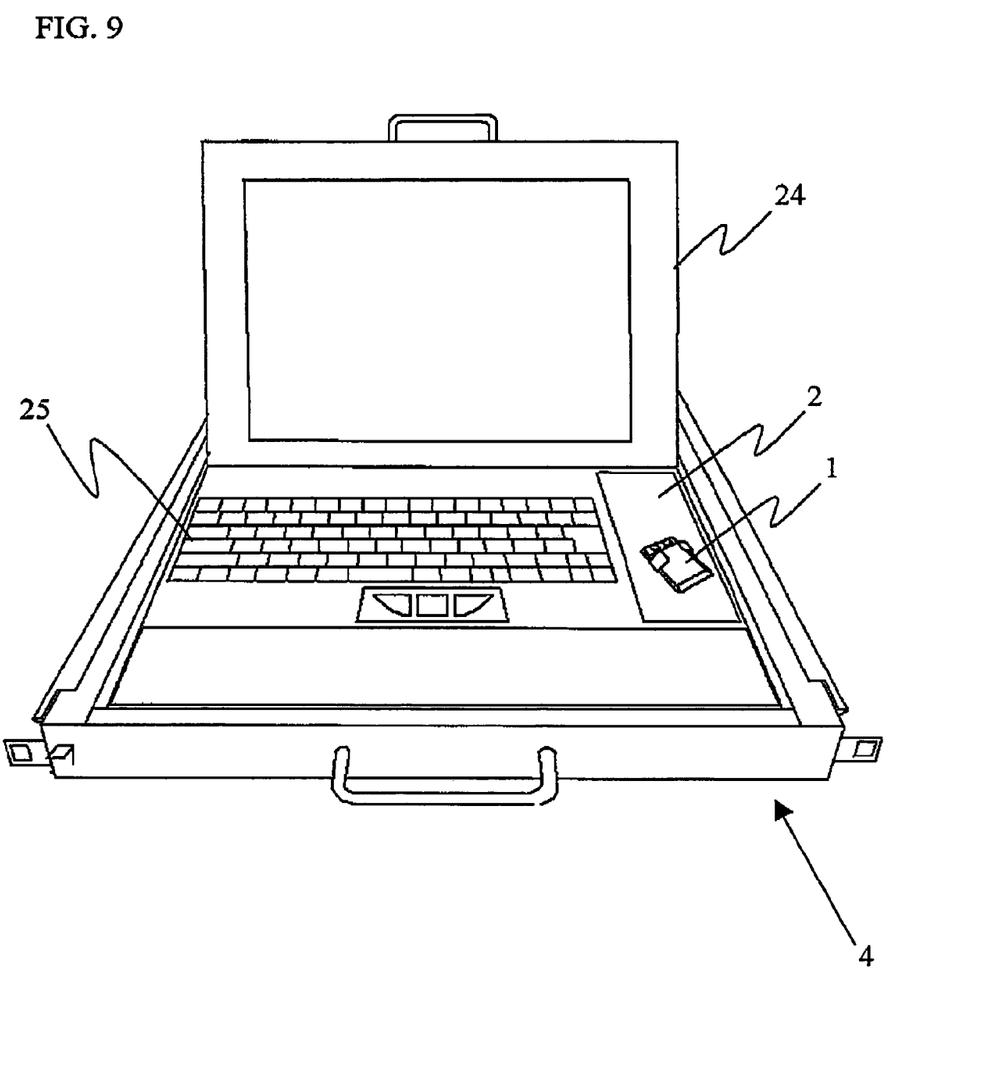
FIG. 9 is a perspective view of a console drawer having the pointing device incorporated thereinto in accordance with the first embodiment of the present invention.
Figure 10:
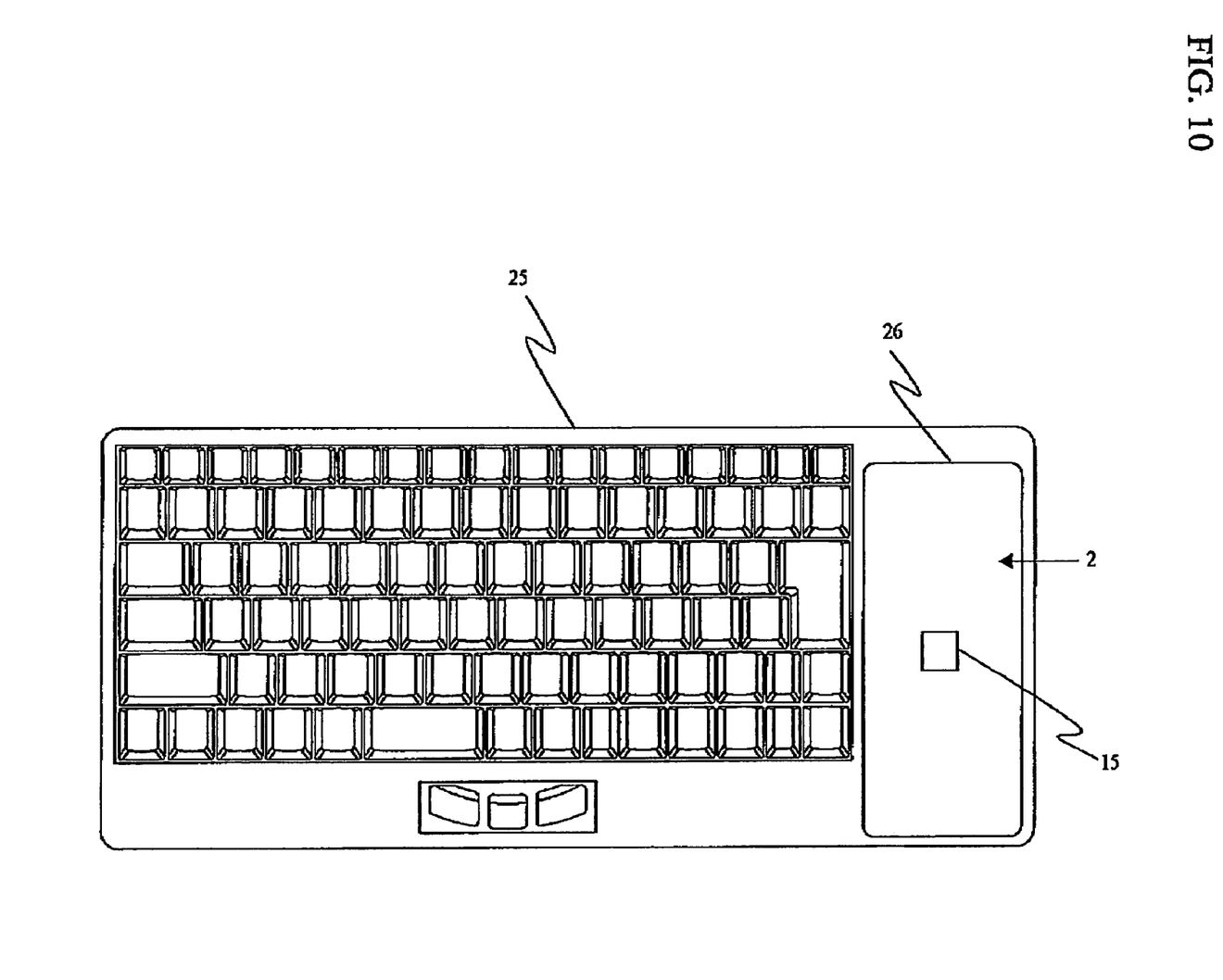
FIG. 10 is a planar view of a keyboard and a mouse pad of the console drawer shown in FIG. 9.

Referring to FIG. 9, the above-mentioned pointing device 3 is incorporated into the console drawer 4. The console drawer 4 includes a crystal liquid display 24, and a keyboard 25. The mouse pad 2 is incorporated on the right side of the keyboard 25. The mouse 1 is to be operated on the mouse pad 2. FIG. 10 is a plain-planar view of the keyboard 25 and the mouse pad 2. The mouse pad 2 includes a frame 26. The frame 26 denotes an operable range, and the optical sensor 15 can be detected in the range. That is to say, if the mouse 1 is operated within the frame 26, it is possible to detect the movement of the mouse 1. The frame 26 can be a guide or an indication for the user.

Figure 11:
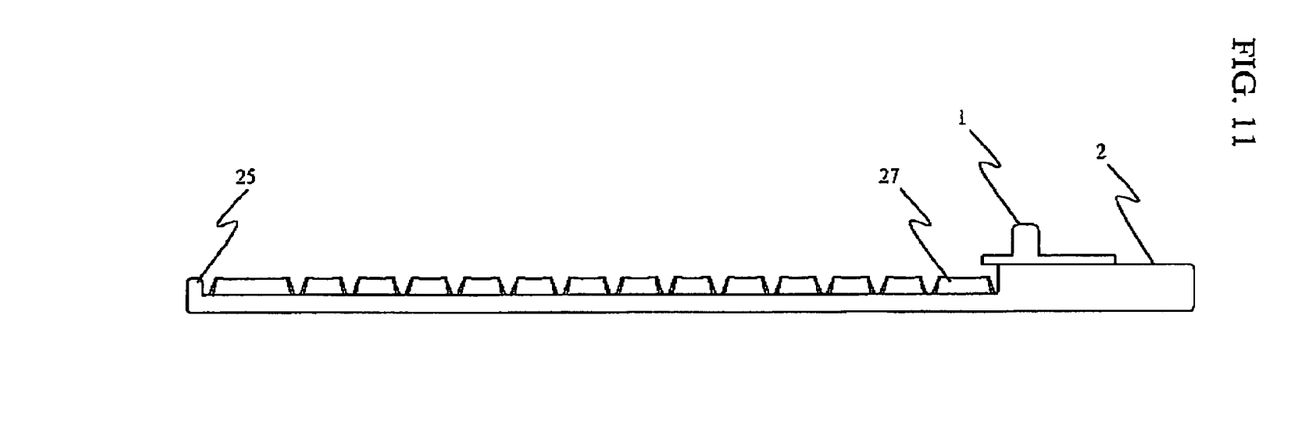
FIG. 11 is a front view of the keyboard and the mouse pad of the console drawer shown in FIG. 9.

FIG. 11 is a front view of the keyboard 25 and the mouse pad 2. A top surface of the mouse pad 2 is arranged above keys 27 of the keyboard 25. With this configuration, the mouse 1 is not in touch with the keys 27. It is thus possible to operate the mouse 1 smoothly.

The console drawer 4 is thus configured. The crystal liquid of the display 24 is not damaged, even if the display 24 is closed together with the mouse 1 placed on the mouse pad 2.

Second Embodiment

Figure 12:
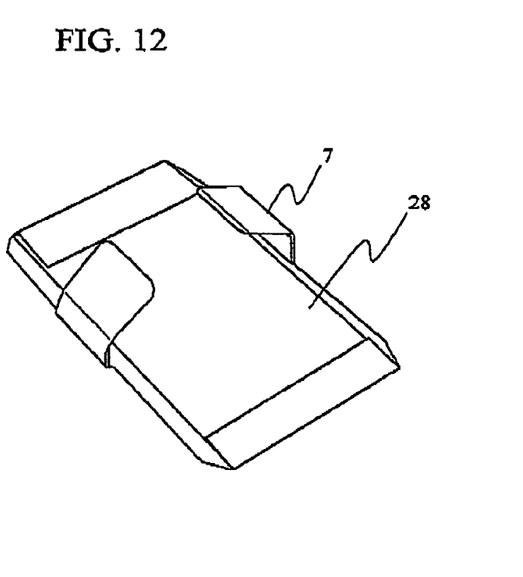
FIG. 12 is a perspective view of the mouse in accordance with a second embodiment of the present invention.

Next, a second embodiment of the present invention will be described, with reference to FIG. 12. A mouse 28 is different from the mouse 1 of the first embodiment of the present invention. The mouse 28 does not include the right button 8a, the left button 8b, or the mouse side coil 9. That is to say, the mouse 28 is moved on the mouse pad 2 for only moving the pointer displayed on the display screen in accordance with the second embodiment of the present invention. Preferably, any key on the keyboard 25 is assigned for the buttons corresponding to the right button 8a and the left button 8b, or dedicated buttons are installed. With the above-mentioned mouse 28, it is possible to operate the buttons with a left hand. The holder 7 in accordance with the second embodiment of the present invention is the same as in the first embodiment of the present invention.

Third Embodiment

Figure 13:
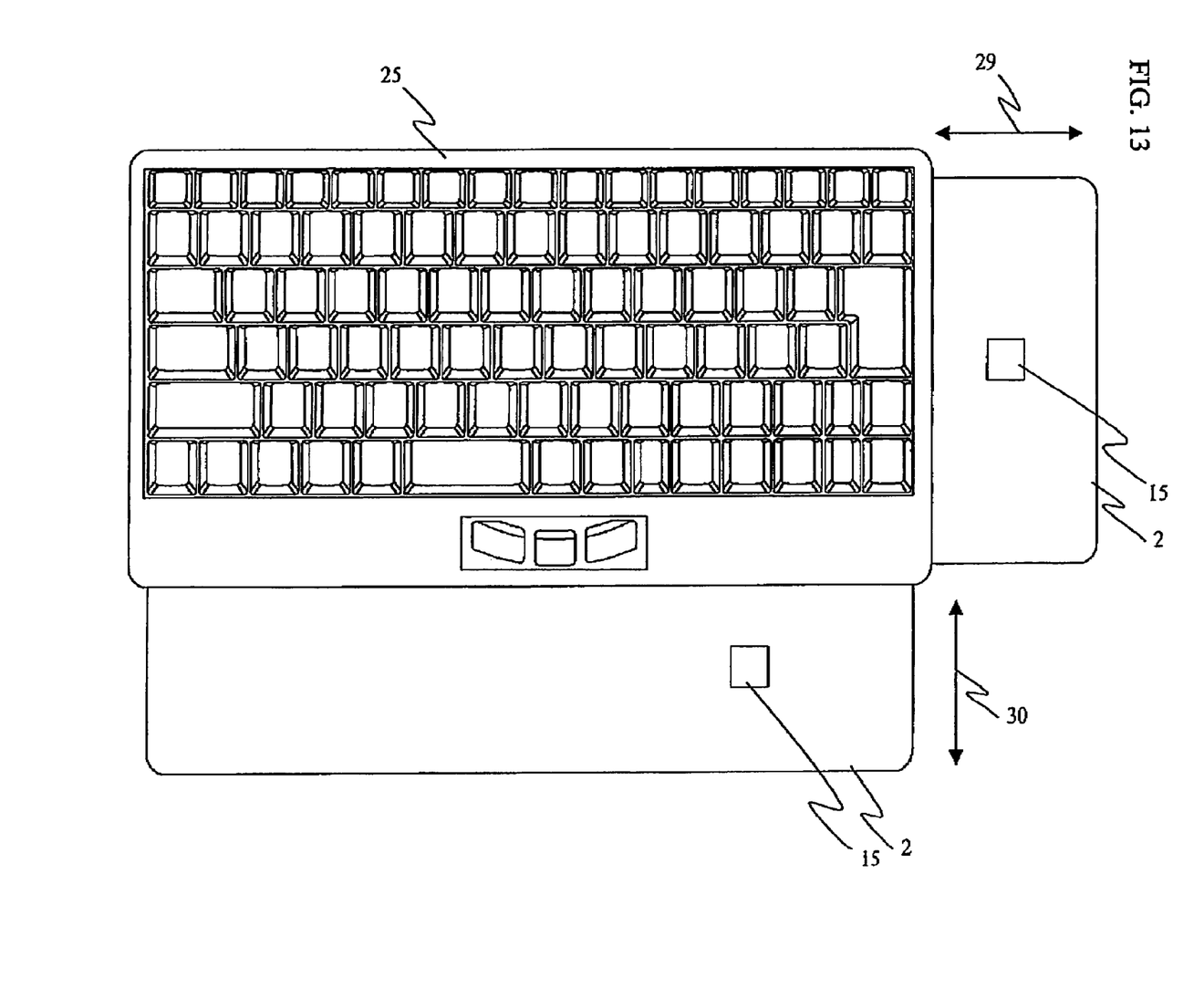
FIG. 13 is a planar view of a keyboard and a mouse pad of the console drawer in accordance with a third embodiment of the present invention.

Next, a third embodiment of the present invention will be described, with reference to FIG. 13. A keyboard 25 shown in FIG. 13 is capable of housing the mouse pad 2 under the keyboard 25. That is to say, the mouse pad 2 can be taken out when it is used, and can be overlapped under the keyboard 25 as arrows 29 or 30 when it is not used. It is thus possible to save space when the mouse pad 2 is not used.

Fourth Embodiment

Figure 14:
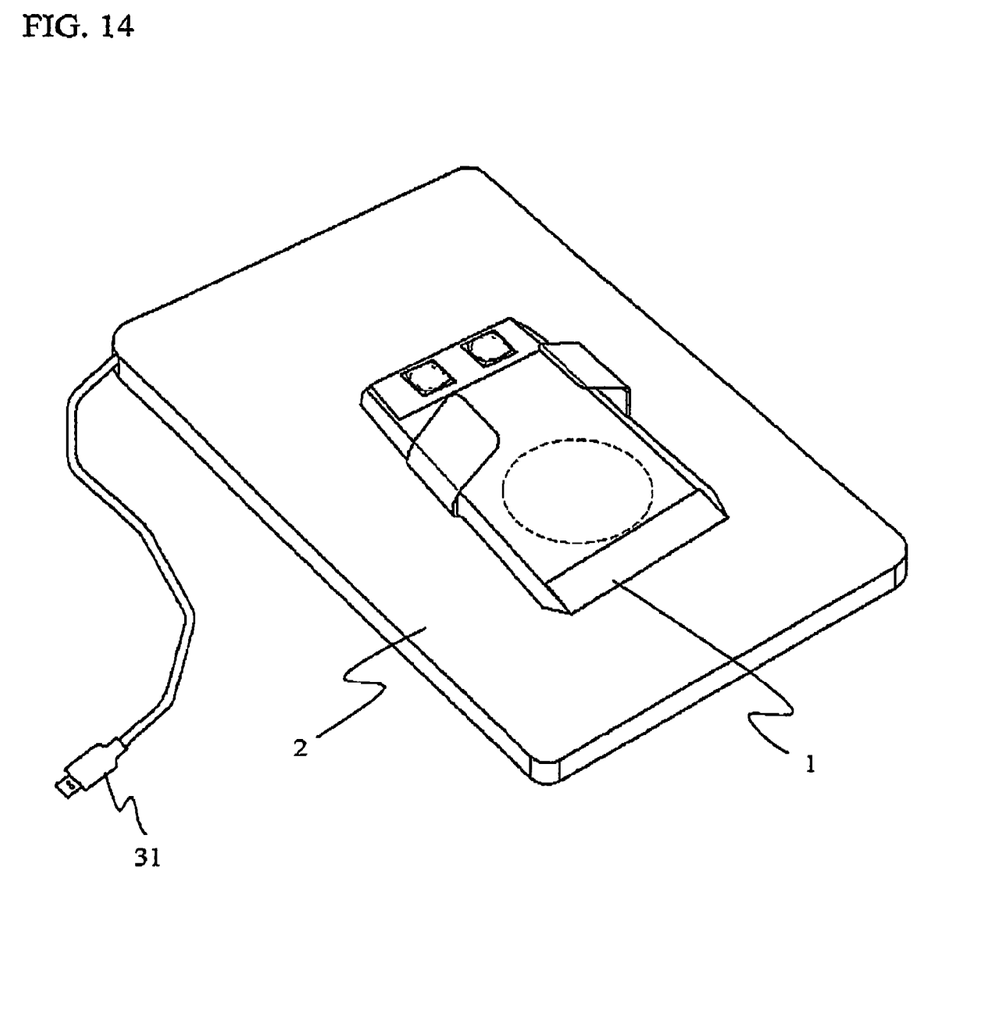
FIG. 14 is a perspective view of a mouse and a mouse pad in accordance with a fourth embodiment of the present invention.

Next, a fourth embodiment of the present invention will be described, with reference to FIG. 14. The mouse pad 2 shown in FIG. 14 can be connected to the console drawer 4 with a cable 31 such as USB. With this configuration, the mouse pad 2 can be connected to various devices.

The mouse pad of the present invention emits and reflects a light, and thereby the thickness of the mouse can be reduced.

The present invention is not limited to the above-mentioned embodiments, and other embodiments, variations and modifications may be made without departing from the scope of the present invention.

The present invention is based on Japanese Patent Application No. 2004-124693 filed on Apr. 20, 2004, the entire disclosure of which is hereby incorporated by reference.

What is claimed is:

1. An information terminal device comprising:
an information input unit having a keyboard incorporated therein; and
a display screen that can be opened and closed overlapping the information input unit,
wherein the keyboard comprises a cordless pointing device used for moving a pointer displayed on a display screen and selecting information displayed on the display screen, the cordless pointing device comprising:
an operation device including a plate having an optical reflection surface and an upper surface opposite to the optical reflection surface so that the whole operation device has a plate shape, and buttons that are provided on the upper surface of the plate and are operated by an operator's finger placed directly on the upper surface, the buttons generating an instruction on the information pointed by the pointer;
a light-emitting and receiving unit, which is a separate unit from the operation device, and emits a light to the optical reflection surface of the operation device and receives the light reflected from the optical reflection surface of the operation device, the operation device being manipulated directly on a flat mouse pad of the keyboard located close to a group of keys, the light-emitting and receiving unit being provided in the flat mouse pad so that the optical reflection surface slides on the flat mouse pad of the keyboard including the light-emitting and receiving unit; and a control unit that moves the pointer according to a movement of the operation device detected by the light-emitting and receiving unit when the light is received and detects the instruction given by the switch.

2. The information terminal device as claimed in claim 1, wherein the flat and mouse pad of the keyboard is higher than tops of the group of keys.

3. The information terminal device as claimed in claim 1, wherein the flat mouse pad has a frame indicating an operable range.

* * * * *